Patented June 20, 1939

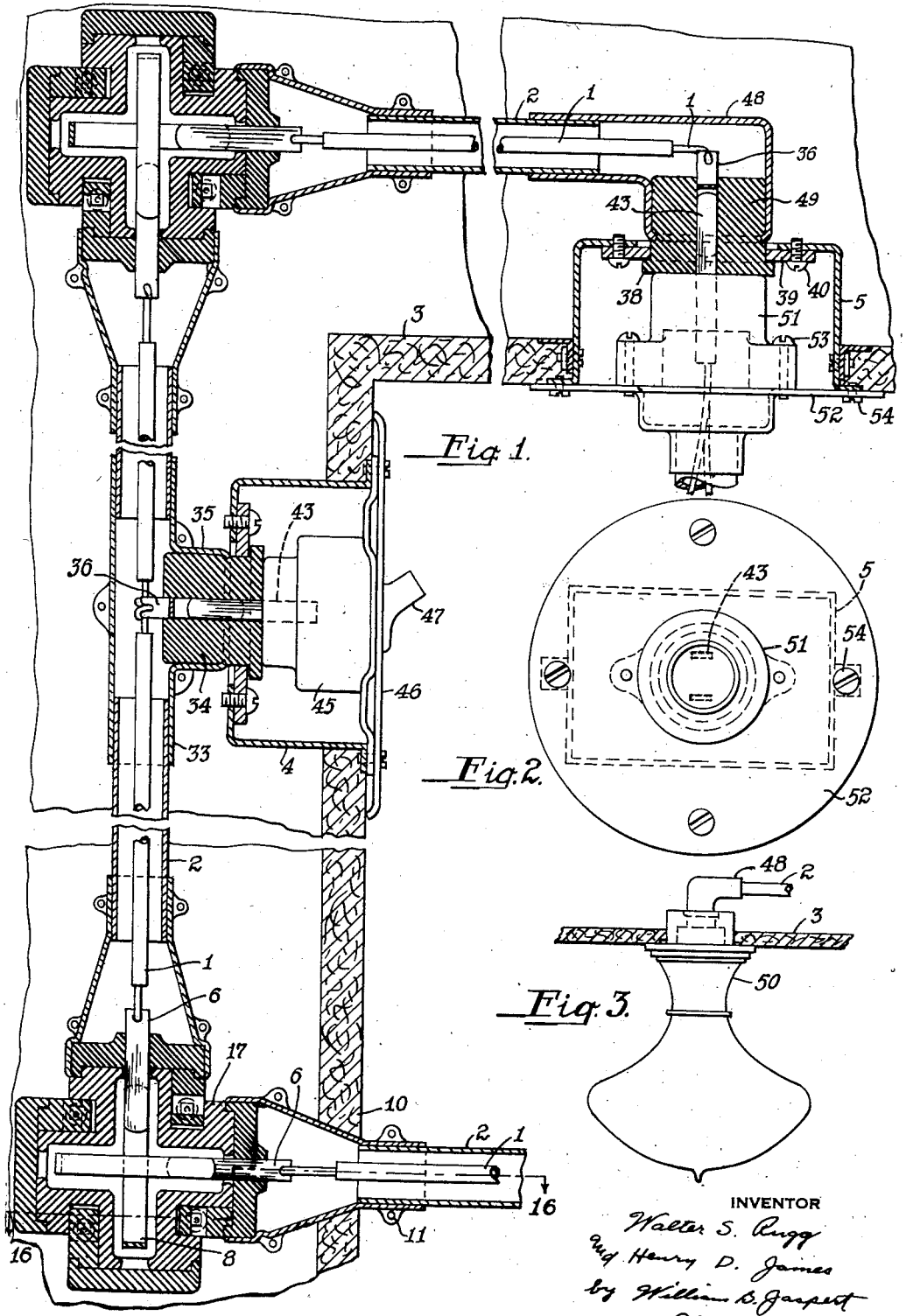

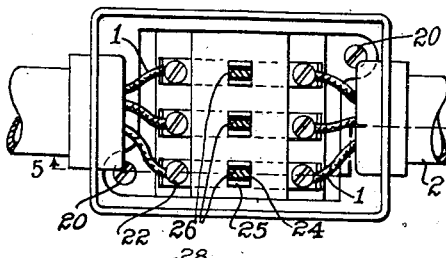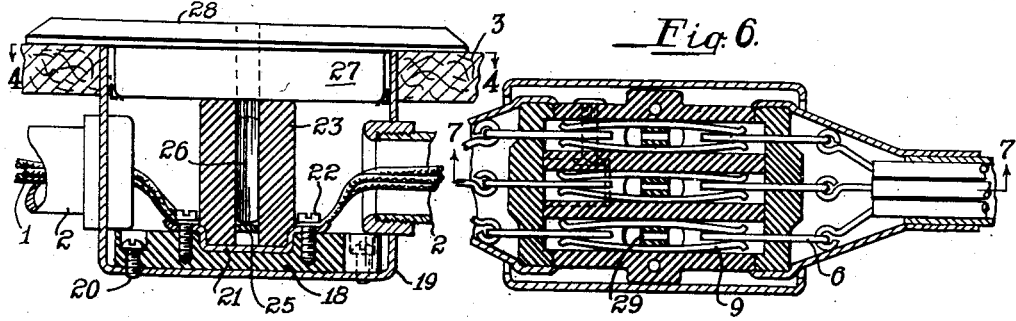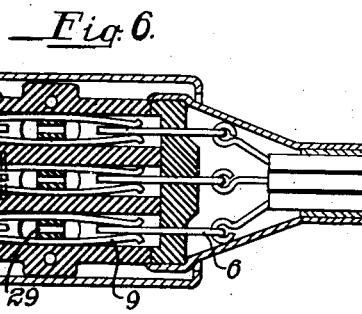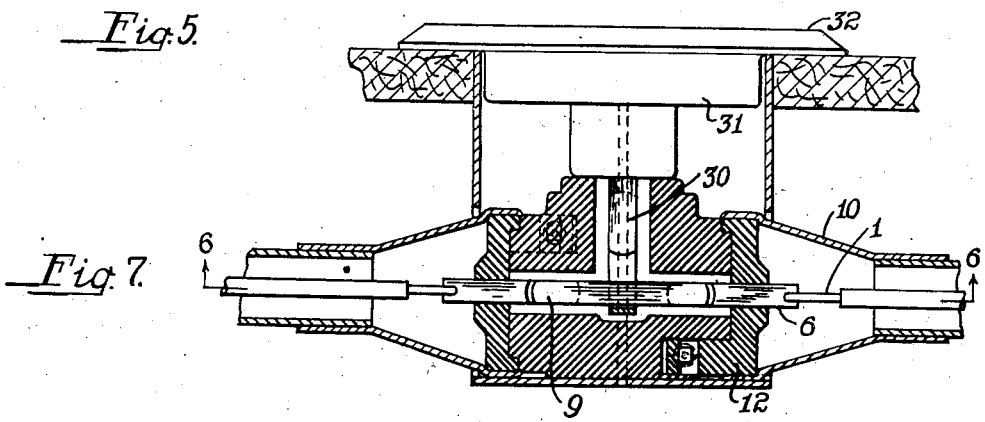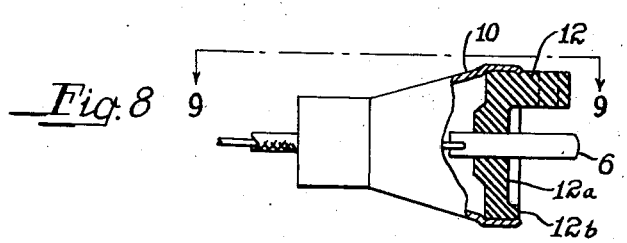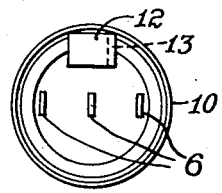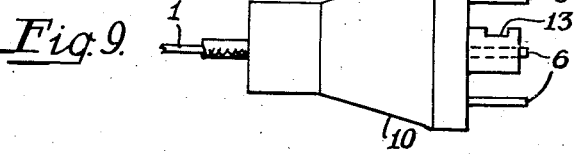

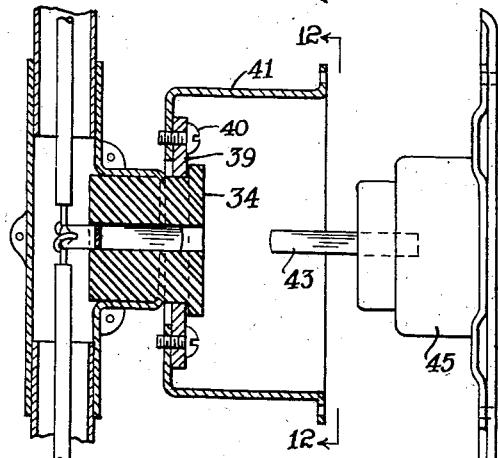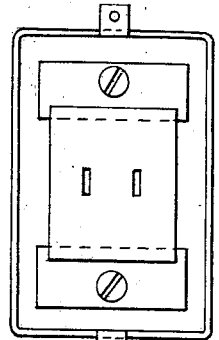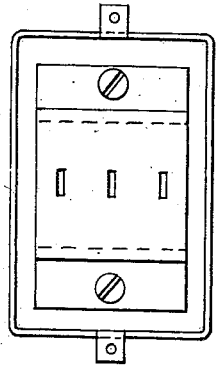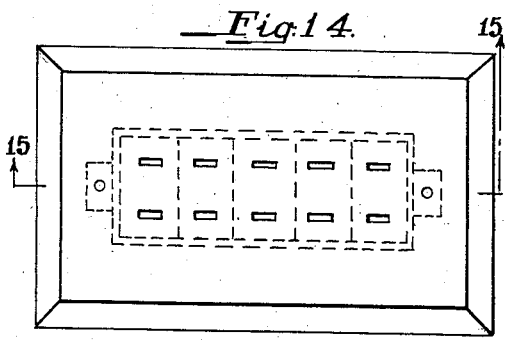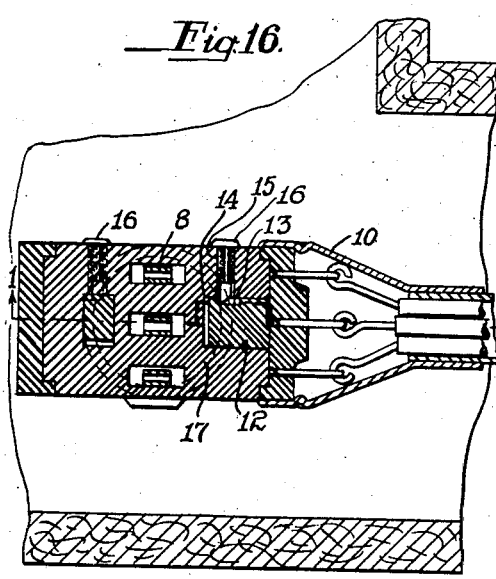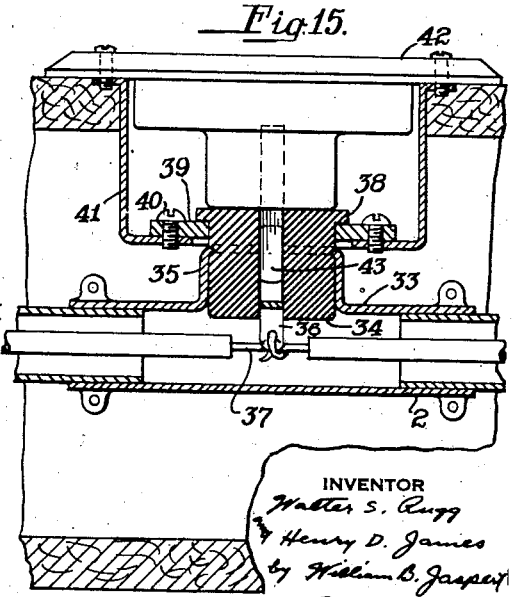

2,162,864

UNITED STATES PATENT OFFICE 2,162,864

PREFABRICATED WIRING SYSTEM

Walter S. Rugg, Pittsburgh, and Henry D. James, Edgewood, Pa.

Application March 19, 1937, Serial No. 131,774

2 Claims. (Cl. 174—70)

This invention relates to electrical house wiring systems or the like, more particularly to a system of wiring consisting of prefabricated lengths of conductor cable together with the protective housings such as conduits which can be assembled in a building without splicing the ends of the cable, or protective housings as in the conventional form of wiring system, and the invention further contemplates the provision of junction units for receiving the ends of the cable and housing, and outlet boxes or receptacles which are attachable to the power cables and conduit through plug receptacles that are permanently connected to said cables and conduit.

It is among the objects of the invention to provide a wiring system for connecting lights, switches, baseboard outlets and other utility outlets which shall be provided with means for connecting, removing and changing the electrical terminals without connecting or disconnecting the wires, such wiring systems being prefabricated to desired length, and to include all necessary electrical connections, at the factory.

It is a further object of the invention to provide a prefabricated wiring system of the above designated character embodying means for joining cable ends and means for securely locking the connected ends together.

Another object of the invention is the provision of prefabricated wiring systems of the above-designated character in which all electrical conductors are protected against exposure, including the protection of the cable ends during construction.

Still a further object of the invention is the provision of outlet receptacles for power lines which shall embody terminal plug receptacles permanently connected to the conductor cables and which shall be adapted to receive plug terminals of outlet boxes, lighting fixtures and switches or the like.

The foregoing objects of the invention will become more apparent from a consideration of the accompanying drawings constituting a part hereof in which like reference characters designate like parts and in which:

Fig. 1 is a sectional elevational view with parts broken away, for convenience of illustration, of a prefabricated wiring system and outlets therefor embodying the principles of this invention;

Fig. 2 an end elevational view of an outlet terminal for receiving a lighting fixture or the like, as shown in side elevation in Fig. 3;

Fig. 4 a plan view of an outlet receptacle permanently attached to the power cable in accordance with the principles of this invention taken along the line 4—4, Fig. 5;

Fig. 5 a vertical section of the outlet box of Fig. 4 with the cover thereon, taken along the line 5—5, Fig. 4;

Fig. 6 a horizontal sectional view taken along the line 6—6, Fig. 7, of an outlet box connection of the plug type;

Fig. 7 a vertical section thereof taken along the line 7—7, Fig. 6;

Fig. 8 a sectional elevational view of a cable end connection for insertion into a junction unit;

Fig. 9 a plan view thereof taken on the line 9—9, Fig. 8;

Fig. 10 an end elevational view of the cable end connection;

Fig. 11 an exploded view partially in section and partially in elevation of an outlet receptacle and switch;

Fig. 12 a plan view of the outlet receptacle of Fig. 2, with the switch element removed, showing two plug terminal receptacles for a two-wire system;

Fig. 13 a similar view for a three-wire system;

Fig. 14 a plan view of a five-plug outlet with the cover thereon;

Fig. 15 a cross-sectional view thereof taken along the line 15—15, Fig. 14; and

Fig. 16 a cross-section of a junction unit taken along the line 16—16, Fig. 1, the view of the junction unit of Fig. 1 being taken along the line 1—1 of Fig. 16.

With reference to Fig. 1 of the drawings, the wiring system consists of conductor cables 1 of a predetermined length disposed in conduit 2 which may be rigid but preferably of the "BX" type which is flexible so that the lengths can be made somewhat longer than required or can be turned around corners, the prefabricated lengths being determined from the architect's drawing. Fig. 1 is illustrative of the adaptation of prefabricated wiring to a building in which the bottom horizontal conductor constitutes the baseboard power line, the vertical conductor the sidewall power line, and the top horizontal conductor a power line for ceiling fixtures.

The numeral 3 represents the inside wall or partition to which, as shown in Fig. 1, are attached outlet boxes 4 and 5. The conductor cables 1 are provided with either terminals or plugs 6 to which the ends of the conductors are permanently attached in any suitable manner as by brazing. The conductor end terminals 6 are adapted to be plugged into a junction unit 17 which, as more clearly shown in Fig. 16 of the drawings, is provided with flat spring terminals 8 for receiving the end terminal 6 of the conductor cables. The junction unit of Fig. 16 is for a three-wire system and the spring terminals 8 are joined as by welding at their juncture, Fig. 1, to constitute an integral conductor for establishing an electrical circuit through the conductor cables, which are attached to the junction unit.

To interlock the cables and conduits 1 and 2 with the junction unit 17, they are provided with an end connection, as is more clearly shown in Figs. 8 to 10 inclusive of the drawings consisting of a tapered ferrule 10, which may be a split member provided with lugs 11, Fig. 1, joined by rivets or screws, the expanded end of which is crimped over an interlocking attachment 12, Fig. 8, having a slot 13 for interlocking with a spring finger 14, Fig. 16, that is biased by a spring 15 and provided with a flat head 16. The end of the finger which interacts with the slot 13 is chamfered to facilitate slipping the attachment 12 into the opening of the junction unit. Once the finger has slipped in place by the tension of spring 15, the attachment 12 is securely interlocked with the junction unit with the face 12a and 12b abutting against the correspondingly-shaped faces of the junction unit. To remove the end terminal from the junction unit, the head 16 of the spring finger may be lifted by a screw driver or other implement to release it from the slot 13, which permits withdrawal of the conductor cable terminals.

From the description of the junction unit and connecting cable terminals, it will be apparent that by furnishing the conductor cables in prefabricated lengths, they may be assembled with facility and without requiring any electrical wiring connections to be made.

In addition to the manner of connecting the ends of the conductor cables, as hereinabove described, an important feature of the invention which makes the use of prefabricated wiring practical is to provide them with permanent outlet terminals which may assume various forms as will hereinafter appear.

A simple form of outlet box is shown in Figs. 4 and 5 and consists of a base 18 of insulating material secured to the outlet box 19 by screws 20, the outlet box being of substantial depth to extend flush with the wall or baseboard 3 and being provided with openings for receiving the ends of conduits 2. Bus bars 21 are secured in the base 18 by terminal screws 22 which attach the ends of the conductor cable 1 to the outlet box. A block 23 of insulating material extends upwardly from the bus bars and is provided with openings 24 for receiving terminals 25 of the bus bars and plug terminals 26 of the plug receptacle 27 which in turn may have any number of outlet receptacles in the outer face 28 thereof.

To assemble the outlet receptacle of Figs. 5 and 4, it is extended through the opening in the baseboard, and the loose ends of the conductor cable 1, having appropriate fittings, are fastened by the terminal screws 22 to the bus bars, as shown in Fig. 4. The outlet receptacle is then merely plugged into the openings 24 of the insulating member 23 and the outlet is thus completely assembled. Attaching screws may be inserted in the cover plate 28 in the usual manner or the latter may be held in place only by the plug terminals 26.

Another form of outlet is shown in Figs. 6 and 7 in which the terminal connections are similar to those in the junction units described in connection with Fig. 1, the conductor cables 1 having the same end connections as for use in the junction units, and the outlet is provided with the spring terminals 9 for receiving the end terminals 6 of the conductors. The spring terminals 9, as shown in Fig. 6, are provided with terminals 29 adapted to receive plug terminals 30 of the outlet member 31, which requires no further attachment than a fastening screw for the face plate 32.

Still another form of outlet is shown in Figs. 14 and 15 in which a conduit 33 is connected to the conduit 2 and a plug of insulating material 34 is secured in a boss or off-set portion 35 of the conduit 33. Terminals 36 are provided in the insulating block 34, these terminals being permanently attached to the cable 37. The top of the insulating block 34 may be flanged, as shown at 38, to interact with an insulating plate 39 fastened by screws 30 to the outlet box 41, and an outlet receptacle 42 provided with plug terminals 43 is electrically attached by plugging into the insulating member 34. As shown in Fig. 14, the outlet receptacle may be provided with a plurality of outlets of which there are five shown in Fig. 14. In the multiple form of outlet receptacle, the outlets may be connected in a three-wire system so that some of the plug receptacles are joined to a switch controlled line and others directly in the power circuit, the connections being effected through bus-bar connections with the terminals of the three conductors to bring about the electrical connections desired by plugging-in the utility devices in appropriate outlets. By this means, clocks may be direct-connected to the power circuit, whereas floor lamps and other electrical appliances may be connected to the switch line to be simultaneously controlled.

In the form of Figs. 11 to 14 are shown outlet terminals similar to that of Fig. 15 provided with a switch attachment having plug terminals 43 for insertion in the terminal receptacles 34, of which there are two in Fig. 12 and three in Fig. 13, depending upon whether the connection is for a two or three-wire system. The construction of the switch 45 may be of the usual form with a cover plate 46 and switch knob 47. The switch of Fig. 11 is shown assembled in Fig. 1 of the drawings.

Referring to Figs. 1, 2 and 3 of the drawings, the prefabricated wiring system is eminently adapted for attachment of lighting fixtures to the ceiling through the following devices. An L-shaped conduit 48 is attached to the conduit 2 and is of a shape to house a block of insulating material 49 attached to the outlet box 5 in the manner of the outlet connection of Fig. 15, like reference characters designating like parts in the two structures.

The terminal 36 is attached to the cable 1 and coacts with plug terminals 43. The light fixture 50, Fig. 3, is attached to the outlet terminal by the bracket 51, from which terminals 43 project and a plate 52 is joined to the bracket 51 by screws 53, the plate in turn being connected to the outlet box 5 by screws 54.

The fixtures may be replaced by fixtures having like connecting parts, which are interchangeable, and when removed from the attaching receptacle no conductors of the wiring system will be exposed and a blank plug may be inserted in the receptacle or a blank cover plate 52 may be attached to the outlet box.

All of the outlet boxes with the plug receptacles are attached to the prefabricated wiring system by merely plugging into the permanent receptacles thereof and are, therefore, interchangeable at will, and when not in use they may be blanked-off with false plugs without danger of short-circuiting of the power line. Repairs to the oulet receptacles can be made without cutting off the current, and the entire system of wiring can be installed without necessitating that any wiring connections be made as in the conventional form of house wiring systems.

It is evident from the foregoing description of the invention that a prefabricated wiring system with the junction units and outlet receptacles adapted for joining the cable and electrical devices is both simple and practical and may be economically produced in production quantities.

It is also evident that in the use of such prefabricated units the wiring systems of buildings will be of uniform excellence throughout, as it does not depend upon the skill and efficiency of an electrician to effect proper electrical junctions and contacts. By means of the ceiling attachment for the lighting units, the hazards and displeasing appearance of ceiling connections are eliminated.

It is also apparent that the ceiling attachments can be readily added to existing lighting fixtures at the factory. The switches and baseboard receptacles may be molded with the plug contacts in place and L or T fittings of the conduits are eliminated as the junction units take care of these requirements.

Although several embodiments of the invention have been herein illustrated and described, it will be apparent to those skilled in the art that various modifications may be made in the details of construction without departing from the principles herein set forth.

We claim:

1. A prefabricated electrical wiring system comprising a plurality of sections of pre-cut conduit of predetermined length, conductors in each of said sections, an insulating block disposed in the ends of and closing each section, and having a contact blade projecting therefrom to which a conductor end is secured within the section, junction receptacles for connecting the sections, contact sockets in said receptacles for receiving the contact blades projecting from the ends of the sections, the insulating block of the conduit sections and the junction receptacles having complementary-shaped interacting faces for relieving the strain on the blade terminals, and interlocking means to prevent displacement of the conduit and receptacle members when in their assembled position.

2. A prefabricated electrical wiring system comprising a plurality of sections of pre-cut conduit of predetermined length, conductors in each of said sections, an insulating block disposed in the ends of and closing each section, and having a contact blade projecting therefrom to which a conductor end is secured within the section, junction receptacles for connecting the sections, contact sockets in said receptacles for receiving the contact blades projecting from the ends of the sections, the insulating blocks of the conductor sections being provided with projecting portions and said junction receptacles being recessed for receiving said projecting portions whereby to relieve the terminal blades of mechanical strain, said projecting and recess portions being provided with interlocking means operative upon the placement of the projecting portion into its cooperating recess.

WALTER S. RUGG.
HENRY D. JAMES.